Jan. 2, 1940.  R. L. BROWNLEE  2,185,537
TRANSMISSION GEARING
Filed Feb. 3, 1939  2 Sheets-Sheet 1
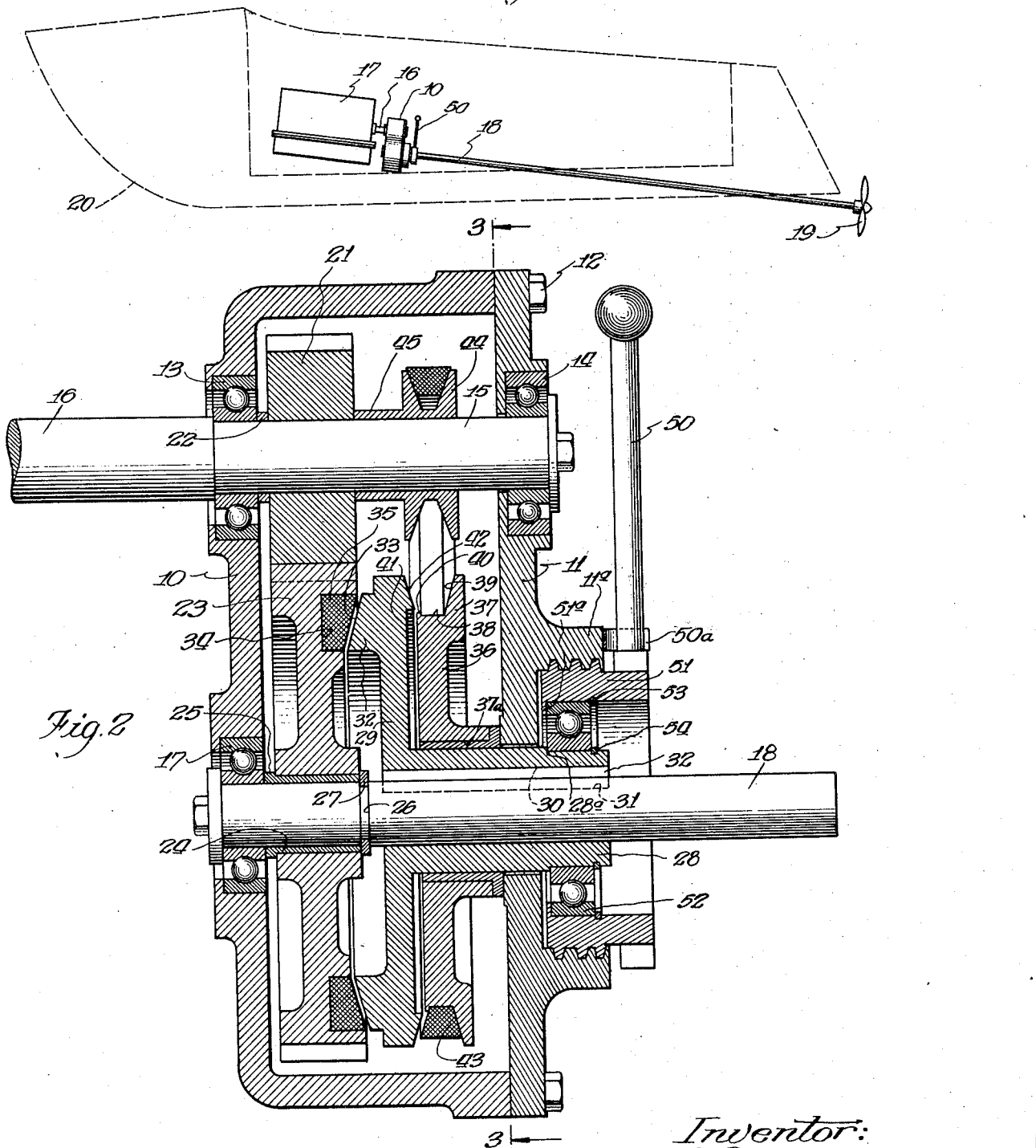
Inventor:
Robert L. Brownlee
Stevens & Batchelor
By: Atty's.

Inventor:
Robert L. Brownlee
Stevens & Betchelor
By: Atty's

Patented Jan. 2, 1940

2,185,537

UNITED STATES PATENT OFFICE 2,185,537

TRANSMISSION GEARING

Robert L. Brownlee, Chicago, Ill.

Application February 3, 1939, Serial No. 254,481

8 Claims. (Cl. 74—376)

My invention relates to transmission gearings, and more particularly to the type which deliver only forward and reverse motion, and my main object is to provide a gearing of this type in which the change from forward to reverse and vice versa is easily and smoothly negotiated.

A further object of the invention is to provide a gearing which is particularly suitable for use in boats and other marine vessels, where the reverse propeller drive is employed to check or stop the forward motion of the vessel.

A still further object of the invention is to employ a reduction drive in the novel gearing which lends its control an advantageous leverage.

Another object of the invention is to incorporate in the novel gearing a combination of clutches heretofore patented by me, but with a novel inter-relation.

A further object of the invention is to design the gearing in such a manner as to utilize its control for the additional purpose of a bearing for the delivery drive.

An important object of the invention is to design the gearing as a simple, sturdy and compact unit which is readily applicable or adaptable for interposition between the driving and driven elements of a power delivery.

With the above objects in view, and any others which may suggest themselves from the description to follow, a better understanding of the invention may be had by reference to the accompanying drawings, in which—

Fig. 1 is a side elevation of the novel gearing as applied to a power plant in a boat;

Fig. 2 is a magnified vertical section of the gearing;

Figure 4:
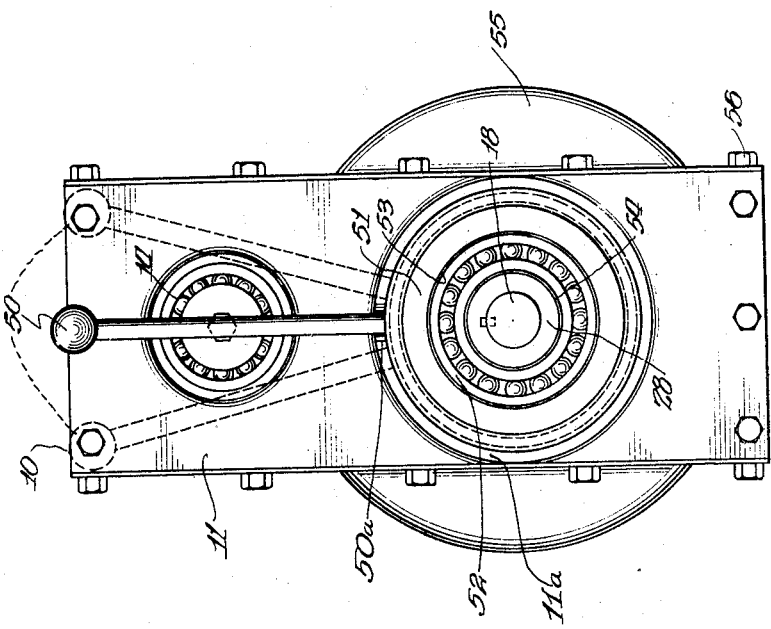
Fig. 4 is a rear-end view of the gearing on the same scale as Fig. 3.
Figure 3:
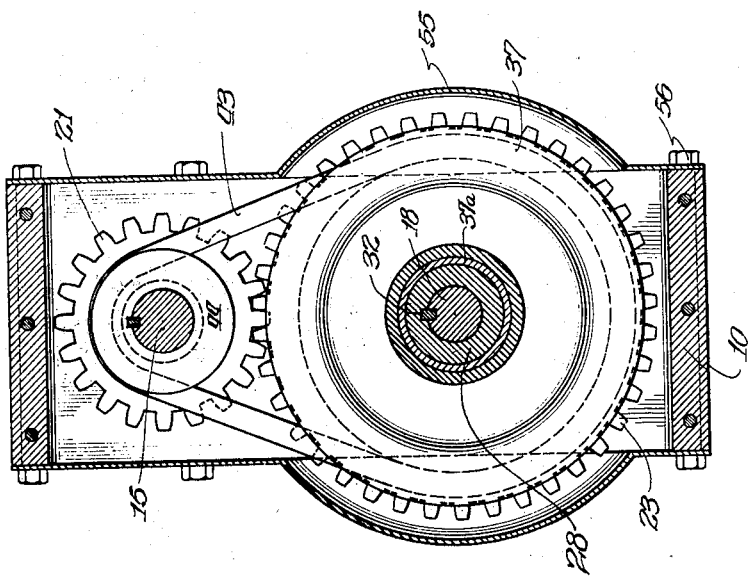
Fig. 3 is a section on a smaller scale taken on the line 3—3 of Fig. 2.

Forward-and-reverse gear sets have been used in simple power deliveries, and more frequently in boats or other marine vessels where a change in the direction of the drive is required. However, the conventional types of forward-and-reverse gear sets are hard to control and impose an undue strain on the power source when a quick change in the drive must be made. I have therefore devised the present gearing as a means to obtain a smooth transmission of the drive as well as an easy change thereof in either direction.

In accordance with the foregoing, the frame for the novel gearing is composed of two sturdy members 10 and 11. The member 10 is a channel opening rearwardly upon the member 11, which is a heavy plate. The frame members are secured by top and bottom bolts 12 directed through the plate 11 into the upper and lower flanges of the channel 10.

The upper portion of the frame contains ball-bearings 13 and 14 in the parts 10 and 11 to journal a horizontal shaft 15. This shaft is forwardly extended at 16 to become coupled to or form the rear part of the drive from an engine 17 or other power source.

Some distance below the shaft 15 the channel 10 contains a ball-bearing 17 for the forward end of another horizontal shaft 18, the rear portion of this shaft being supported in a manner to be later explained and extending to constitute the delivery of the drive. Thus, this shaft may be elongated as indicated in Fig. 1 to receive a propeller 19 at its rear end for the propulsion of the boat 20.

A reverse reduction drive between the shaft 15 and the zone of the shaft 18 is provided by mounting a spur pinion 21 on the shaft 15 in slightly spaced relation to the channel 10, the intervening space being occupied by a shaft collar 22. The pinion 21 is fast on the shaft 15 and in mesh with a gear 23 receiving a bronze bushing 24 to become journaled on the shaft 18. The bushing has a frontal flange 25 to space the gear from the channel 10; and the shaft 18 is grooved at 26 to receive a split collar 27 as a rear end stop for the gear hub.

The shaft 18 slidably receives the hub 28 of a frontal disk 29 facing the gear 23 from the rear, the said hub and shaft being longitudinally grooved at 30 and 31, respectively, for the lodging of a long key 32 in the shaft and to form a guide for the sliding motion of the disk hub.

The disk 29 is formed with a forward annular enlargement 32 having a conically inclined forward face 33. The gear 23 is annularly recessed at 34 opposite the enlargement 32 to seat a compressible lining 35 whose rear face is formed to match the forward face 33 of the enlargement as suggested in Fig. 2. Ordinarily, the units just described are slightly spaced as shown, but when the disk 29 is advanced an engagement occurs between the enlargement 32 and the lining 33 with a clutching action, whereby to transmit the motion of the shaft 15 through the pinion 21, the gear 23 and the disk 29 to the shaft 18. The particular clutch is described and covered in my Patent No. 2,135,384 dated November 1, 1938.

The shaft 18 also carries a second disk 36 shortly behind the disk 29 and receiving a bronze bushing 37a in its hub to become journaled on the hub 28 of the disk 29. The disk 36 has a thickened outer portion 37 to afford room for a peripheral groove 38 having a high flaring wall 39 at the rear and a short flaring wall 40 at the front. A continuation of this wall occurs, however, in the form of a rearward enlargement 41 of the disk 29, the rear face 42 of this enlargement having a conical formation of the same slope as the rear wall 39 of the groove 38. The groove 38 thus provides a flared channel in the peripheral region of the disk 36 which is suitable to receive a V-type belt 43. This belt rises with a gather to become trained around a V-type pulley 44 made fast on the shaft 15 some distance to the rear of the pinion 21, the hub 45 of the pulley meeting the rear face of the pinion to form a stop therefor.

The arrangement just described forms a forward reduction drive between the shaft 15 and the shaft 18 by employing the disks 29 and 36 as a clutch of the type shown and described in my Patent No. 2,097,559 dated November 2, 1937. It will be apparent that by retracting the disk 29 the enlargement 41 will bear upon the belt 43 to wedge the same tightly between the walls 42 and 39 of the groove 38, thus joining the disk 29 to the disk 36. With the latter receiving the reduction drive through the belt 43 from the shaft 15 the effect will be to rotate the shaft 18 in the same direction as the shaft 15, the gear 23 idling on the shaft 18 because of its separated position from the disk 29.

The foregoing functions between the shafts 15 and 18 were obtained by the advance of the disk 29 to secure the reverse drive, and by the retraction thereof to secure the forward drive, and a control will now be described to procure these motions of the disk. Primarily, the control resides in a hand lever 50 which is positioned vertically to the rear of the gearing to indicate that the latter is in the neutral or disengaged condition. This condition is represented by the free position of the disk 29 between the gear 23 and the disk 36 as an indication that the drive of the shaft 15 is not transmitted to the shaft 18, the gear 23 and disk 36 simply idling, and the disk 29 being stationary. The neutral position of the hand lever 50 is indicated by full lines in Fig. 4, and it is my intention that the lever be swung to one or the other of the dotted line positions to procure a connection of the drive to deliver forward or reverse motion to the driven shaft 18.

Accordingly, the hand lever 50 is rigidly mounted on a traveling screw 51 threaded in a rear extension 11a of the plate 11. The traveling screw 51 is tu.. ar in order to accommodate a ball-bearing 52 between it and the hub 28 of the disk 29, the forward end of the screw having an inward flange 51a as a forward limit for its part of the bearing and the said hub a shoulder 28a for the same purpose in relation to the inner part of the bearing. The components of the bearing are locked against rearward departure by outer and inner split rings 53 and 54 sunken respectively into the inner and outer peripheries of the screw and hub.

The traveling screw 51 makes a fairly snug mesh with the extension 11a, so that it may be said to be firmly centered in such extension. The screw thus forms a support for the rear portions of the disk hub 28 and the shaft 18 through the ball-bearing 52, eliminating a special bearing in the frame for this purpose.

It will now be apparent that the traveling screw 51 is sufficiently rigid to maintain the hand lever 50 in the neutral position when it is desired that the gearing remain or be maintained in the disconnected position, since the disk 29 is at rest and imposes no end-thrust on the shaft 18. However, I have shown a spring or friction clip 50a to hold the lever in case looseness of the screw 51 develops from extended use. Moreover, a side movement of the lever in one or the other direction will procure the engagement of the gearing for the corresponding drive of the shaft as previously explained, depending on the direction of the screw thread. Of course, a suitable indication or marking will be made on the plate 11 to show which drive is obtained by the corresponding shifted position of the hand lever.

As the gearing is not of a character to run in oil, the enclosure 10—11 is not in the form of a housing but made as a simple frame for purposes of economy. However, the frame is supplemented on the sides by sheet metal enclosures 55, secured by bolts 56, in order to keep dust and foreign objects from entering into the mechanism.

It will be evident from the above description that I have provided a transmission gearing which is particularly adaptable for use on boats, where the reversal of the drive is often or must be quickly resorted to. It is apparent that in the present gearing this is done with two leverage advantages. First, the drive is already stepped down to reduce the speed and provide a large engaging area for the clutch elements; and second, the sweep of the hand lever 50 from the neutral position to an operative one is considerable in comparison with the slight travel of the clutch disk 29, this leverage being obtained by the action of the traveling screw 51. Thus, a small amount of exertion is required to induce a powerful application of the clutch; and the engagement of the clutch is sustained, owing to the locking characteristic of the screw 51 from horizontal retraction. Also, the shifted position of the lever 50 is firm because of the resistance offered by the compressible clutch lining 34 or belt 43, as the case may be, this factor also taking up possible looseness of the screw from wear.

As the clutches employed contain linings of a compressible nature, these yield as the thrust is applied to procure a smooth and gradual engagement of the clutch. Further, the units of the assembly are large, sturdy and compactly grouped, so that the cost of producing the gearing is comparatively low and it occupies a small amount of room adjoining the power plant. Further, the gearing is favorably designed to receive the drive from the front to transmit it from the rear, for facility to be interposed in a longitudinal or continuous power drive. The gearing is also favorable for application to a motor boat as indicated in Fig. 1, the position of the driven shaft being low for location in the bottom of the boat. Finally, the novel gearing is an appliance which is of a mechanically efficient nature and controllable without the need of skill.

While I have described the gearing along specific lines, various minor changes and refinements may be made therein without departing from its principle, and I desire to consider all such changes and refinements as coming within the scope and spirit of the appended claims.

I claim:

1. A transmission gearing comprising a frame, a drive shaft journaled in one portion of the same, a driven shaft disposed in another portion of the frame and in parallelism to the drive shaft, a journal for the driven shaft in one end of the frame, a forward-and-reverse reduction drive between the shafts, a slidable support for the driven shaft and effective to actuate said drive, said support passing through the other end of the frame and being joined for rotation with the driven shaft, a longitudinally movable control for the drive, and a bearing between said control and the support.

2. The structure of claim 1, said control being a traveling screw seating in said other end of the frame.

3. The structure of claim 1, said other end of the frame having a tapped outward extension, and a tubular traveling screw concentric with the driven shaft meshed in said extension, said bearing being disposed in the annular space between the screw and said support.

4. A transmission gearing comprising a frame, a drive shaft in one portion of the same, a driven shaft in another portion, a forward-and-reverse reduction drive between the shafts and including driven members with compressible facings selectively and gradually engageable by a clutch on the reciprocatory movements thereof, and a traveling screw joined to the clutch to impart said movements thereto, said screw being maintained in its rotary positions of advance in either direction by the resistance of the facing of the corresponding driven member to the clutch.

5. The structure of claim 1, said control being a traveling screw in said other end of the frame, and an actuating lever extended from said traveling screw.

6. The structure of claim 1, said drive including a clutch operable by reciprocatory movements of said support, a traveling screw centered around the driven shaft and meshed for motion in the other end of the frame, a bearing connecting the traveling screw for longitudinal movement with said support and to journal the latter in the travelling screw, and means to rotate the latter in one or the other direction to secure the corresponding movement of the clutch.

7. A transmission gearing comprising a drive shaft, a driven shaft in parallelism with the same, a gear and a pulley on the driven shaft and freely rotatable in relation thereto, pinion and compressible-belt drives from the drive shaft to the gear and pulley respectively to operate these units in opposite directions, a clutch between the gear and pulley and joined for rotation with the driven shaft, a compressible lining carried by the gear opposite the clutch, said pulley seating the belt against outward departure and with the inner face thereof opposite the clutch, and the latter being movable into engagement with either the gear lining or the portion of the belt carried by the pulley to transmit rotation gradually from the drive shaft to the driven shaft in the corresponding direction.

8. The structure of claim 7, said lining having an annular course, the contiguous faces of said lining and belt portion receding inclinedly from each other toward the center, and the clutch having the portions engageable with said faces parallel to the same.

ROBERT L. BROWNLEE.